(12) United States Patent
Kim et al.

(10) Patent No.: US 6,650,394 B1
(45) Date of Patent: Nov. 18, 2003

(54) IDENTIFICATION MARK PORTION IN LIQUID CRYSTAL DISPLAY PANEL AND FABRICATING METHOD THEREOF

(75) Inventors: Jong-Woo Kim, Kumi-shi (KR); Kyoung-Nam Lim, Kumi-shi (KR); Mi-Kyung Chu, Anyang-shi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 112 days.

(21) Appl. No.: 09/599,992

(22) Filed: Jun. 23, 2000

(30) Foreign Application Priority Data

Sep. 1, 1999 (KR) .......................................... 1999-36913

(51) Int. Cl.⁷ ............................................. G02F 1/1343
(52) U.S. Cl. ............................. 349/158; 349/42; 349/52
(58) Field of Search ............................. 349/158, 42, 52

(56) References Cited

U.S. PATENT DOCUMENTS 5,361,150 A * 11/1994 Noguchi ..................... 359/62
6,304,304 B1   10/2001 Koma

FOREIGN PATENT DOCUMENTS

JP  359052867    * 3/1984
JP  359052867 A  * 3/1984

* cited by examiner

*Primary Examiner*—Toan Ton
*Assistant Examiner*—Hoan Nguyen
(74) *Attorney, Agent, or Firm*—McKenna Long & Aldridge LLP

(57) ABSTRACT

The present invention relates to an identification mark portion and fabricating method thereof, more particularly, to an identification mark portion introduced in a liquid crystal display panel and a fabricating method thereof, which minimizes the error in verifying an ID of a pad by preventing at least two insulating layers from overlapping each other over the upper part of the pad. The present invention includes an insulating substrate, an ID mark pad including an ID mark on the insulating substrate, and a first insulating layer and a second insulating layer on the insulating substrate wherein the first and second insulating layers expose the ID mark in the ID mark pad. In another aspect, the present invention includes the steps of forming an ID mark pad including an ID mark on an insulating substrate, and forming a first and a second insulating layer which expose the ID mark in the ID mark pad.

25 Claims, 12 Drawing Sheets

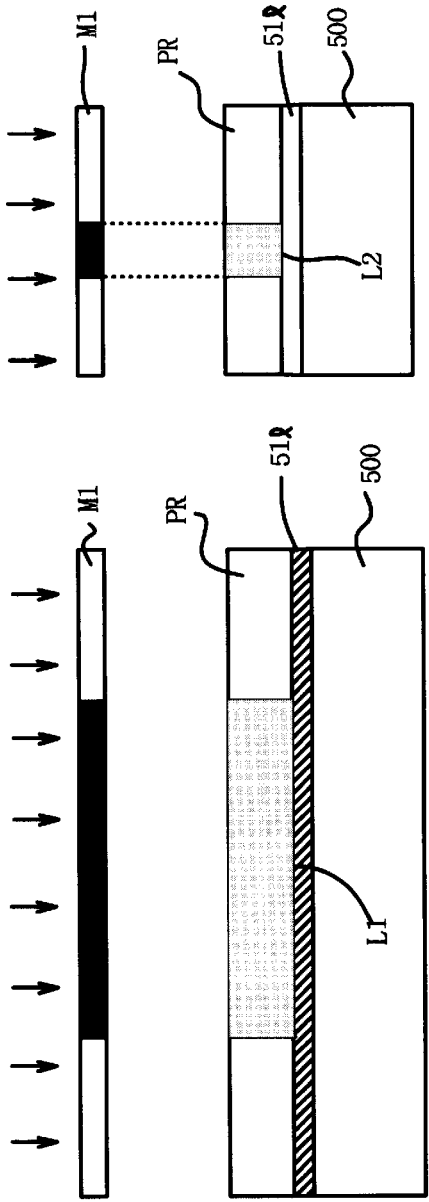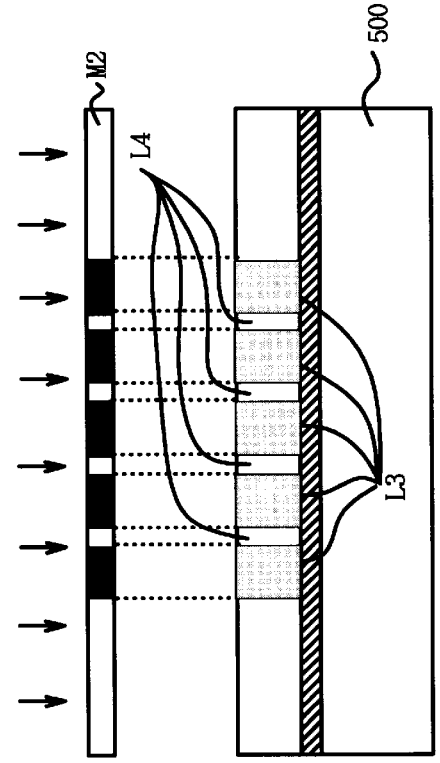
FIG. 12A
FIG. 12B

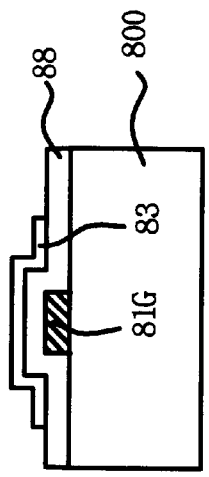
FIG. 13A
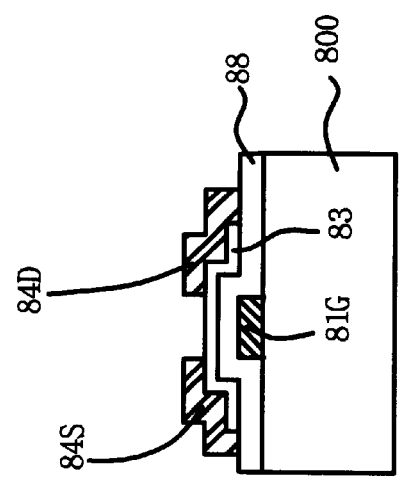
FIG. 13B
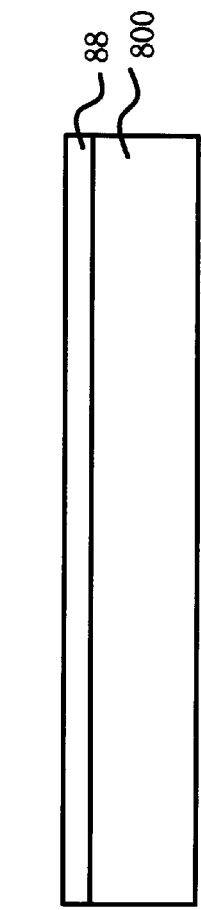
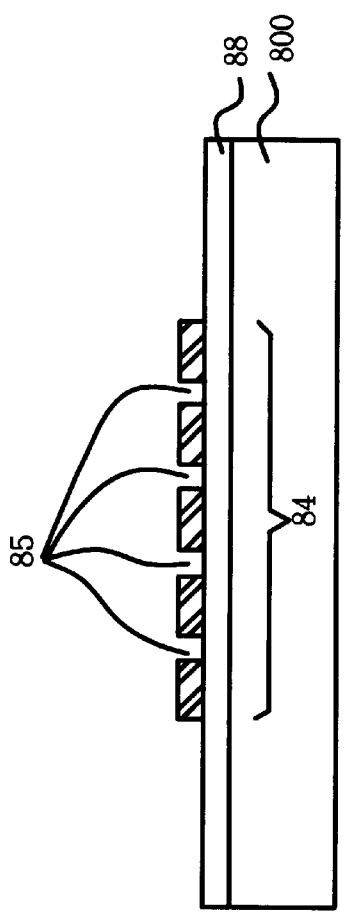

IDENTIFICATION MARK PORTION IN LIQUID CRYSTAL DISPLAY PANEL AND FABRICATING METHOD THEREOF

This application claims the benefit of Korean Patent Application No. 1999-36913, filed on Sep. 7, 1999 which is hereby incorporated by reference.

BACKGROUND OF THE INVENTION

1. Field of the Invention

The present invention relates to a method of fabricating a liquid crystal display panel, and more particularly, the present invention relates to a method of fabricating an identification mark portion on a liquid crystal display panel.

2. Discussion of the Related Art

A liquid crystal display (hereinafter abbreviated LCD) panel is fabricated with an identification (hereinafter abbreviated ID) mark as well as with LCD device patterns.

FIG. 1 shows a schematic plan view showing an LCD panel having an ID mark portion. Referring to FIG. 1, a glass substrate 1 has a device pattern portion 3 and a peripheral portion 2 surrounding the device pattern portion. The device pattern portion includes a matrix array area portion 3A and a blank portion 3B. The blank portion 3B contains an ID mark portion 4.

FIG. 2 shows a layout of an ID mark portion 4 of an LCD panel, and FIG. 3 shows a cross-sectional view of the ID mark portion 4 taken along the cross-section line I–I' in FIG. 2.

Referring to FIG. 2, in the ID mark portion 4, an ID mark pad 20 containing an ID mark 21, is formed. The ID mark pad 20 has the ID mark formed thereon by removing portions of a conductive layer to transcribe the ID mark shape. The conductive layer provided for an ID mark pad 20 in the LCD panel is patterned, as shown in the drawing, in a predetermined form such as a rectangle.

Referring to FIG. 3, a lower insulating layer 210 is overlapped with an upper insulating layer 220 in the upper part of the ID mark pad 20. The lower insulating layer 210 and upper insulating layer 220 are a gate insulating layer and a passivation layer, respectively, in the LCD panel having a bottom gate typed thin film transistor (hereinafter abbreviated TFT). The upper and lower insulating layers are formed with insulating materials such as silicon oxide and silicon nitride.

As mentioned in the above explanation, the related art includes the lower and upper insulating layers constituting two layers over the ID mark pad. Unfortunately, opaqueness of the overlapped insulating layers results in difficulty in recognizing the ID mark. Specifically, the insulating layers have poor light permeability since the insulating layers consist of at least two layers, and the resultant diffusion, refraction, and/or reflection lower the reliability of recognizing the ID mark.

SUMMARY OF THE INVENTION

Accordingly, the present invention is directed to an ID mark portion introduced in a liquid crystal display panel and a fabricating method thereof that substantially obviates one or more of the problems due to limitations and disadvantages of the related art.

An object of the present invention is to provide an ID mark portion in a liquid crystal display panel and a fabricating method thereof which minimizes the errors in verifying an ID mark.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention includes a substrate, an ID mark pad on the substrate having an ID mark, and first and second insulating layers on the substrate, wherein the first and second insulating layers expose the ID mark in the ID mark pad.

In another aspect of the present invention, an ID mark portion in an LCD panel includes a substrate, a first insulating layer on the substrate, an ID mark pad having an ID mark on the first insulating layer, and a second insulating layer exposing the ID mark in the ID mark pad.

In another aspect of the present invention, a method of making an ID mark portion in an LCD panel includes the steps of forming an ID mark pad having an ID mark on the first insulating layer, and forming first and second insulating layers exposing the ID mark in the ID mark pad.

In a further aspect of the present invention, a method of making an ID mark portion in an LCD panel includes the steps of forming a first insulating layer on a substrate, forming an ID mark pad having an ID mark on the first insulating layer, and forming a second insulating layer exposing the ID mark in the ID mark pad.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 12A to 12F show cross-sectional views of fabricating ID mark portions in an LCD panel according to the first embodiment of the present invention;

FIGS. 13A to 13D show cross-sectional views of fabricating ID mark portions in an LCD panel according to the fifth embodiment of the present invention.

DETAILED DESCRIPTION OF THE PREFERRED EMBODIMENTS

Reference will now be made in detail to the preferred embodiment of the present invention, an example of which is illustrated in the accompanying drawings.

Figure 4:
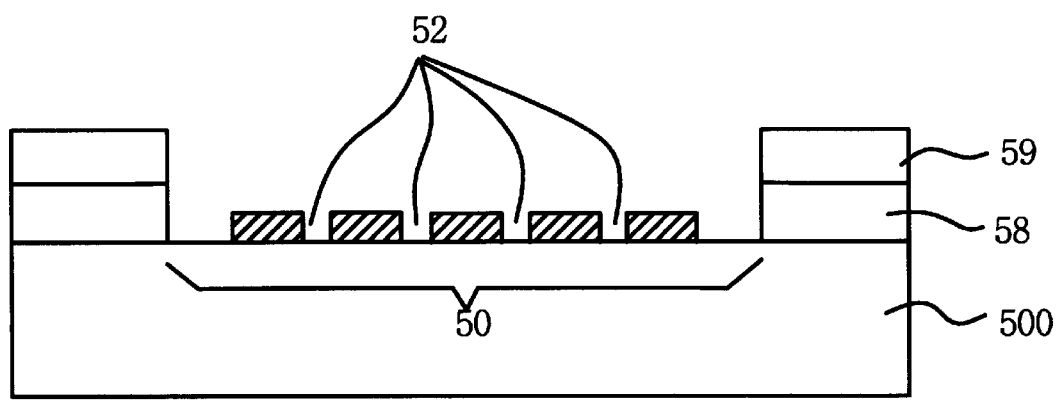
FIG. 4 shows a cross-sectional view of an ID mark portion in an LCD panel according to a first embodiment of the present invention.

FIG. 4 shows a cross-sectional view of an ID mark portion in an LCD panel according to a first embodiment of the present invention.

Referring to FIG. 4, an ID mark pad 51 having an ID mark 52 formed on a substrate 500, and a first insulating layer 58 and a second insulating layer 59 are formed and patterned to expose the ID mark portion 50. The first and second insulating layers 58 and 59 are removed sufficiently to preferably expose the whole ID mark pad 51.

The ID mark portion 50 as well as other LCD panel elements and wires are formed on the same substrate in the course of fabricating an LCD panel. Thus, the ID mark portion is preferably formed by using the same substance or material as the elements and wires of the LCD panel. The ID mark pad 51 in the LCD panel having a bottom gate typed TFTs is formed with the same substance for gate wires. The first and second insulating layers 58 and 59 are a gate insulating layer and a passivation layer, respectively, for example.

Regarding the structure of the ID mark portion of the above LCD panel, the first and second insulating layers are removed in the area of the ID mark portion 50 such that the ID mark 52 of the ID mark pad 51 is exposed. Therefore, the recognition of the ID mark is improved by the present invention since the ID mark is no longer covered by the first and second insulating layers, as in the prior art.

Figure 5:
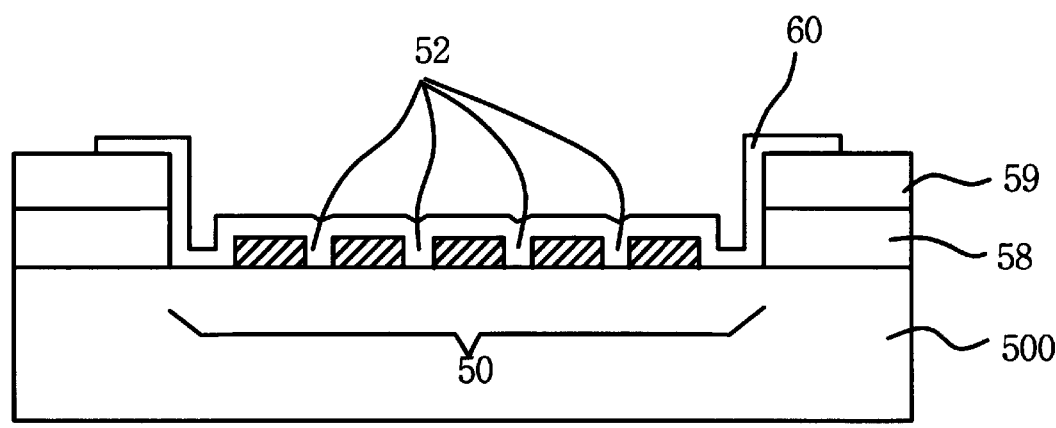
FIG. 5 shows a cross-sectional view of an ID mark portion in an LCD panel according to a second embodiment of the present invention.

FIG. 5 shows a schematic cross-sectional view of an ID mark portion in an LCD panel according to a second embodiment of the present invention.

Referring to FIG. 5, compared to the structure of the ID mark portion of the first embodiment in FIG. 4, an ID mark pad 51 is covered with a transparent layer 60. In this case, the transparent layer 60 is preferably formed of the same material as a pixel electrode. The transparent layer 60 prevents the ID mark pad 51 from being etched by various etchants in any later processes. As with the first embodiment, the first and second insulating layers are removed above the ID mark portion 50 to improve the recognition or readability of the ID mark 52.

Figure 6:
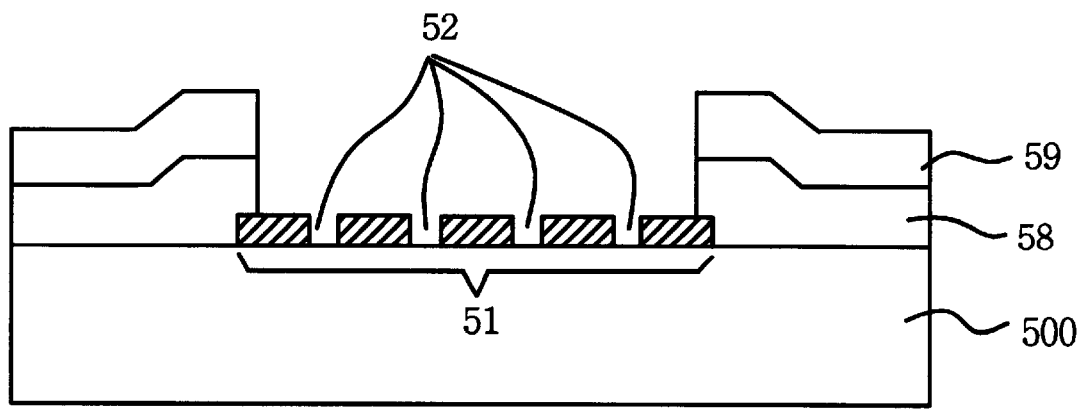
FIG. 6 shows a cross-sectional view of an ID mark portion in an LCD panel according to a third embodiment of the present invention.

FIG. 6 shows a schematic cross-sectional view of an ID mark portion in an LCD panel according to a third embodiment of the present invention.

Referring to FIG. 6, the first and second insulating layers 58 and 59 are formed so that a peripheral part of the ID mark pad 51 is covered by the first and second insulating layers.

Thus, the ID mark pad 51 is partially exposed to include at least the ID mark 52.

Figure 7:
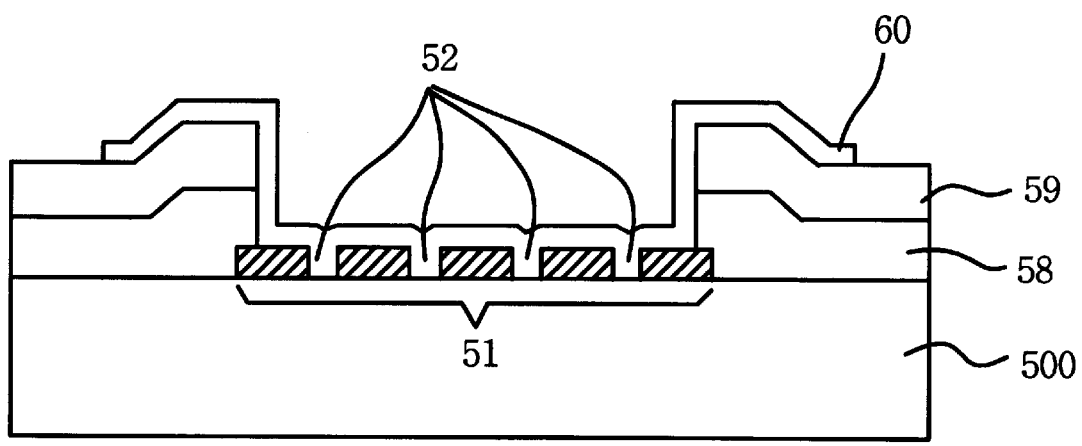
FIG. 7 shows a cross-sectional view of an ID mark portion in an LCD panel according to a fourth embodiment of the present invention.

FIG. 7 shows a schematic cross-sectional view of an ID mark portion in the LCD panel according to a fourth embodiment of the present invention.

Referring to FIG. 7, the fourth embodiment is simliar to the third embodiment and further includes a transparent layer 60 that covers the ID mark pad 51. Thus, the fourth embodiment combines the features of the second embodiment (FIG. 5) and the third embodiment (FIG. 6).

Figure 8:
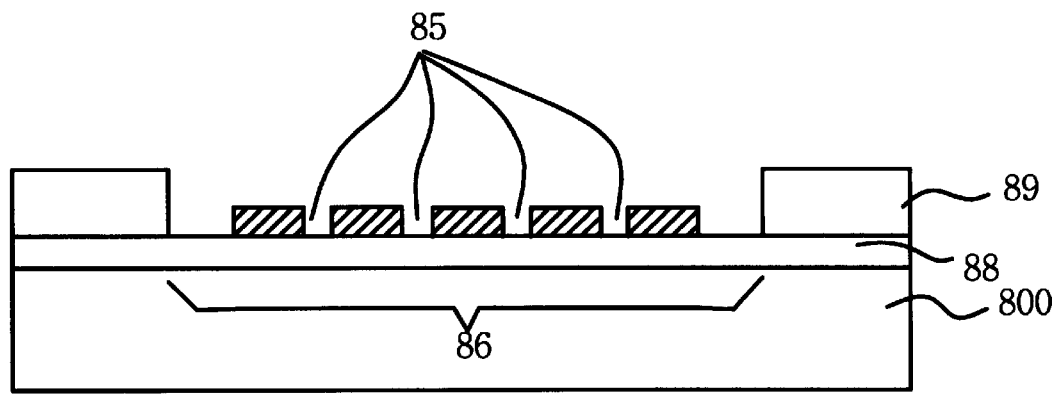
FIG. 8 shows a cross-sectional view of an ID mark portion in an LCD panel according to a fifth embodiment of the present invention.

FIG. 8 shows a schematic cross-sectional view of an ID mark portion in an LCD panel according to a fifth embodiment of the present invention.

Referring to FIG. 8, a first insulating layer 88 is formed on a substrate 800, an ID mark pad 84 having an ID mark 85 is formed on the first insulating layer 88. A second insulating layer 89 is formed on the first insulating layer 88. A portion of the second insulating layer 89 is removed above the ID mark 85 to expose the ID mark portion 80 including the ID mark pad 84. In the present embodiment, the second insulating layer 89 is removed sufficiently to expose preferably at least the whole ID mark portion 80.

The ID mark pad 84 in the LCD panel with a bottom gate typed TFT is formed preferably with the same substance as source and drain wires. The first and second insulating layers 88 and 89 are a gate insulating layer and a passivation layer, respectively, for example.

Regarding the structure of the ID mark portion of the above-referenced LCD panel, the first and second insulating layers are removed in the area of the ID mark portion 80 such that the ID mark 85 of the ID mark portion 80 is exposed. Therefore, the recognition of the ID mark is improved by the present invention since the ID mark pad 84 is no longer covered by the first and second insulating layers, as in the prior art.

Figure 9:
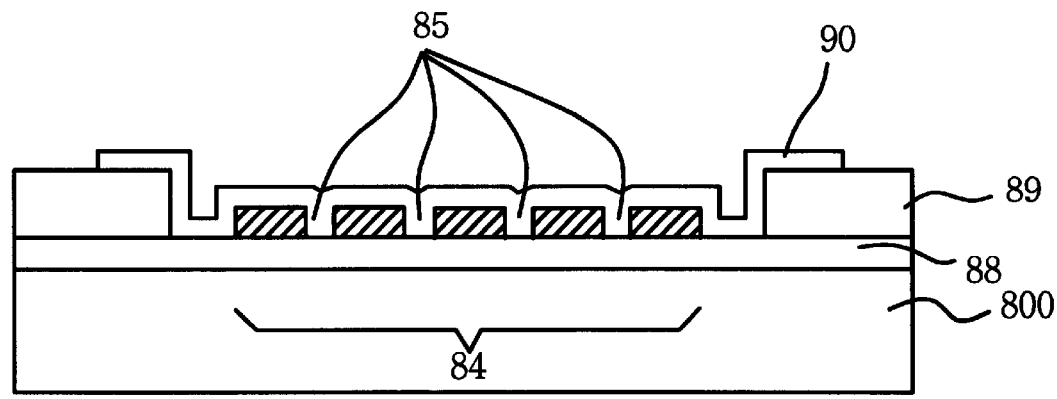
FIG. 9 shows a cross-sectional view of an ID mark portion in an LCD panel according to a sixth embodiment of the present invention.

FIG. 9 shows a schematic cross-sectional view of an ID mark portion in an LCD panel according to a sixth embodiment of the present invention.

Referring to FIG. 9, compared to the structure of the ID mark portion of the fifth embodiment in FIG. 8, an ID mark pad 84 is covered with a transparent layer 90. In this embodiment, the transparent layer 90 is preferably formed from the same material as a pixel electrode. The transparent layer 90 prevents the ID mark pad 84 from being etched by any etchants in later processes.

Figure 10:
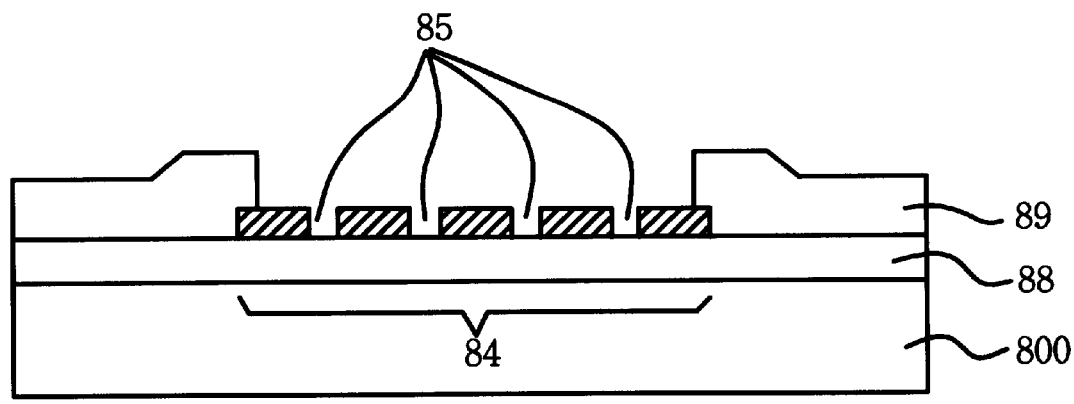
FIG. 10 shows a cross-sectional view of an ID mark portion in an LCD panel according to a seventh embodiment of the present invention.

FIG. 10 shows a schematic cross-sectional view of an ID mark portion in an LCD panel according to a seventh embodiment of the present invention.

Referring to FIG. 10, the second insulating layer 89 is formed so that a peripheral part of the ID mark pad 84 is covered by the insulating layers. Thus, the ID mark pad 84 is partially exposed, including at least the ID mark 85.

Figure 11:
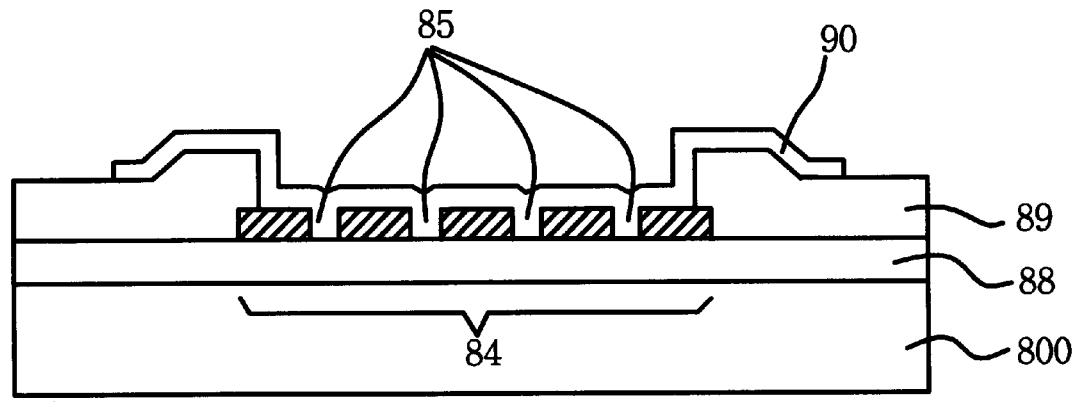
FIG. 11 shows a cross-sectional view of an ID mark portion in an LCD panel according to an eighth embodiment of the present invention.

FIG. 11 shows a cross-sectional view of an ID mark portion in the LCD panel according to an eighth embodiment of the present invention.

Referring to FIG. 11, the eighth embodiment is similar to the seventh embodiment and further includes a transparent layer 90 that covers the exposed part of ID mark pad 84. Thus, the eighth embodiment combines the features of the sixth embodiment (of FIG. 9) and the seventh embodiment (of FIG. 10).

FIGS. 12A to 12F show cross-sectional views of fabricating an ID mark portion in the LCD panel using the first embodiment of the present invention, as an example. The method of fabricating the device of the present invention including a TFT part will be explained in the following description, where left and right parts of the drawings indicate an ID mark portion and a TFT part, respectively.

Referring to FIG. 12A, a gate wiring substance 51L is deposited on a substrate 500. Then, the gate wiring substance 5IL is coated with a positive photoresist PR. A first exposure is carried out using a mask M1 for forming a gate wire. In this case, the mask M1 for a gate wire is patterned so that the area of the ID mark pad is shielded from light. Thus, the photoresist has a pattern corresponding to the mark pad. A non-exposure area L1 in the ID mark portion corresponds to the ID mark pad, while the other non-exposure area L2 in the TFT part corresponds to a gate electrode.

Referring to FIG. 12B, a second exposure is selectively carried out on the ID mark portion using another mask for an ID mark. The second exposure is carried out on the photoresist corresponding to the ID mark in the part of the area to become an ID mark pad for the ID marking step which determines the ID mark.

A non-exposure area L3 in the ID mark portion corresponds to the part of the ID mark pad surrounding the ID mark, while an exposure area L4 forms the ID mark in the ID mark pad.

Figure 12C:
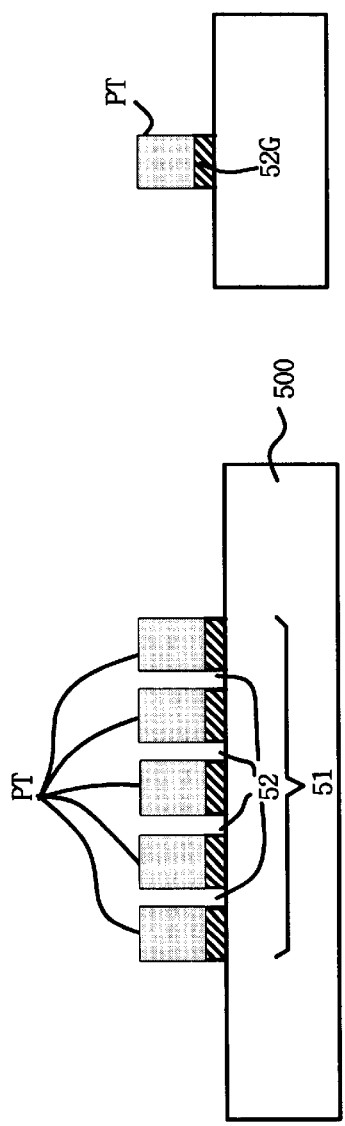

Referring to FIG. 12C, a photoresist pattern PT is defined by removing the exposed part of the photoresist selectively by development. Then, an ID mark pad 51 including the ID mark 52 is formed and a gate wire including a gate electrode 52G are formed by etching a gate wiring substance using the photoresist pattern PT as a mask.

Figure 12D:
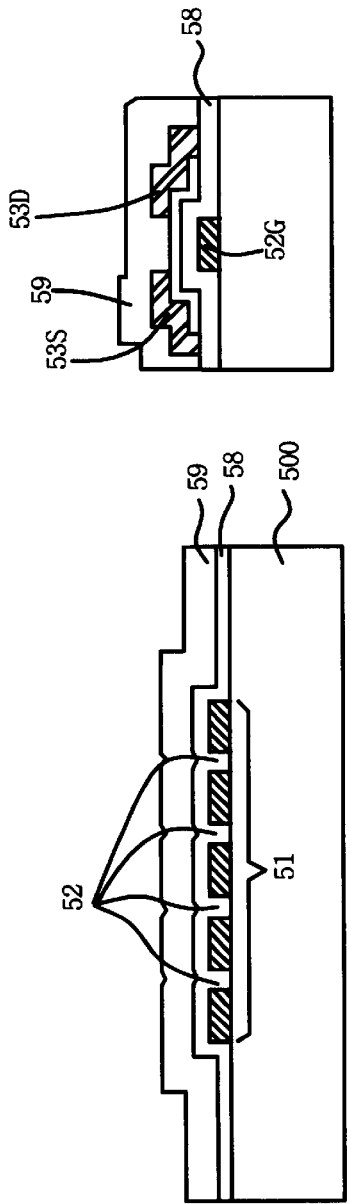

Referring to FIG. 12D, after the photoresist pattern PT has been removed, a TFT is fabricated by forming a gate insulating layer 58 which covers any exposed surface of the substrate, active layer 57, a source electrode 53S, a drain electrode 53D, and source and drain wires or lines using known methods. Then, a passivation layer 59 covering the resultant surface is formed. In this case, the gate insulating layer 58 and passivation layer 59 are deposited to cover the whole exposed surface of the substrate and are formed over the ID mark pad 51 as well.

Figure 12E:
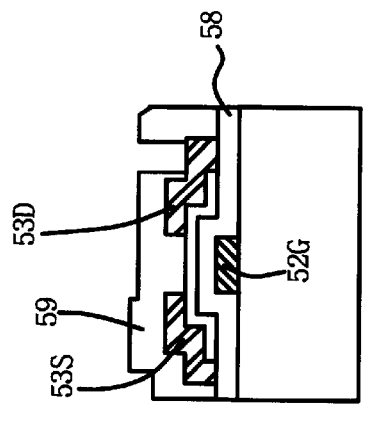
Figure 12E:
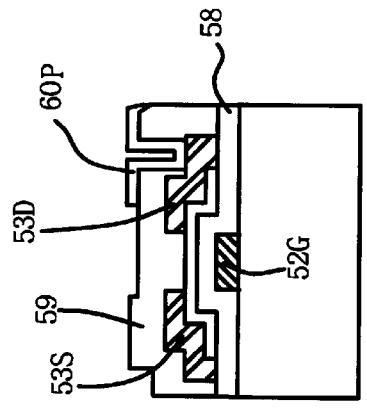
Figure 12E:
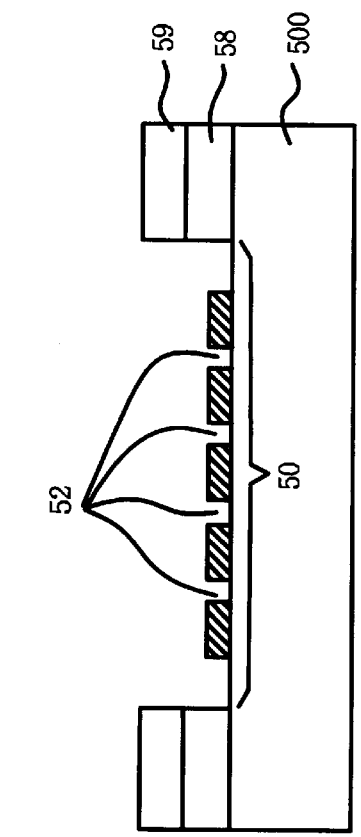

Referring to FIG. 12E, the drain electrode 53D of the TFT part and the ID mark portion 50 including the ID mark pad 51 are exposed by patterning the passivation layer 59 and gate insulating layer 58 by photolithography.

Figure 12F:
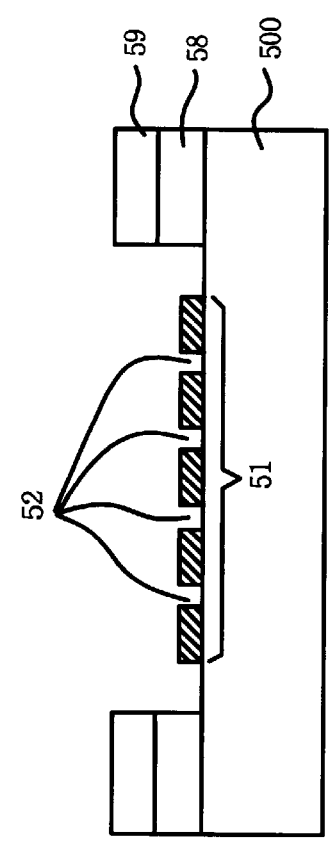

Referring to FIG. 12F, a pixel electrode 60P is formed by depositing a transparent conductive layer for the pixel electrode and by patterning the transparent conductive layer by photolithography.

By the above mentioned steps of fabrication, the ID mark portion according to the first embodiment of the present invention in FIG. 4 is provided.

For the second embodiment of the presention invention, a transparent conductive layer 60 covering the ID mark pad 51 is formed simultaneously with the pixel electrode 60P through the step of patterning the transparent conductive layer 60 by photolithography (herein called the "first step"). In this case, the transparent conductive layer prevents the ID mark pad 51 from being etched by any etchants in later processes.

For the third embodiment of the present invention, the gate insulating and passivation layers are patterned so that the ID mark pad 51 is partially exposed to include at least the ID mark 52 and to cover the peripheral or end parts of the ID mark pad 51 (herein called the "second step").

For the fourth embodiment of the present invention, the first and second steps discussed above are both carried out.

FIGS. 13A to 13D show cross-sectional views of fabricating an ID mark portion in the LCD panel according to the fifth embodiment of the present invention, as an example. The method of fabricating the device of the present invention includes a TFT part that will be explained in the following description, where left and right parts of the drawings indicate an ID mark portion and a TFT part, respectively.

Referring to FIG. 13A, after a gate line material 81 has been deposited on a substrate 800, a gate line including a gate electrode 81 G is formed by patterning the gate line material 81 by photolithography. Then, a gate insulating layer 88 covering the substrate including the gate line is formed.

Referring to FIG. 13B, a TFT is fabricated by forming an active layer 83, a source electrode 84S, a drain electrode 84D, and source and drain lines or wires using known processes. In this embodiment, an ID mark pad 84, including an ID mark 85 is formed with the material for forming the source and drain electrodes in the ID mark portion at the time the source and drain lines are formed.

The step of forming the ID mark pad 84 including the ID mark 85 is formed by using a conductive layer as explained in the above description.

Figure 13C:
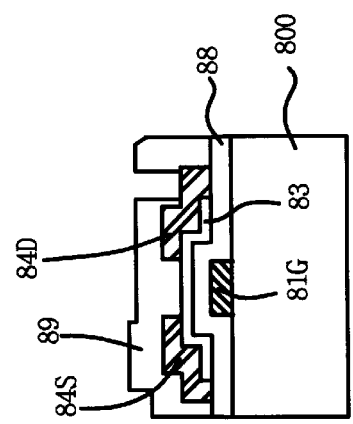

Referring to FIG. 13C, a passivation layer 89 covering the substrate 800 is formed. In this case, the passivation layer 89 deposited to cover the whole surface of the substrate is formed over the ID mark pad 84 as well. Then, the drain electrode 84D of the TFT part and the ID mark portion 86 including the ID mark pad 84 are exposed by patterning the passivation layer 89 by photolithography.

Figure 13D:
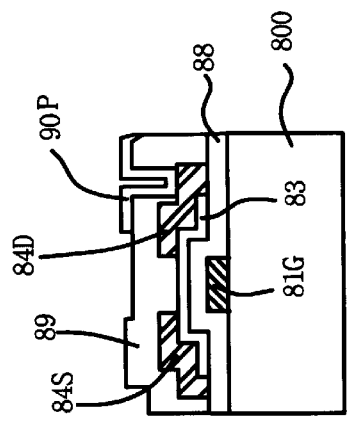
Figure 13D:
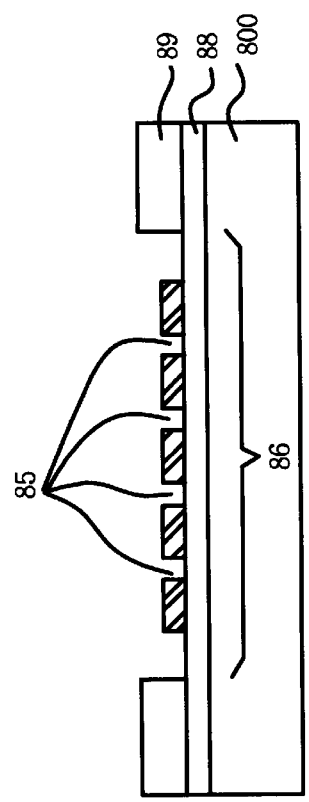
Figure 13D:
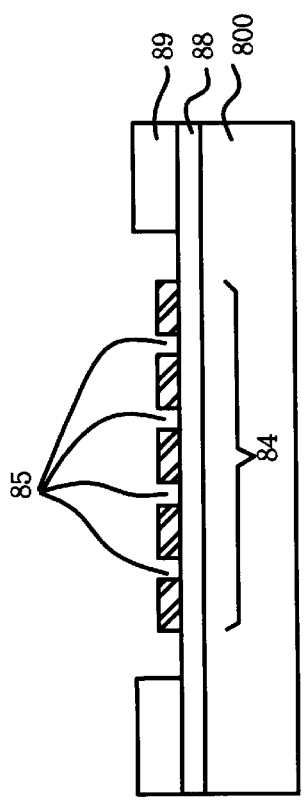

Referring to FIG. 13D, a pixel electrode 90P is formed by depositing a transparent conductive layer 90 for the pixel electrode 90P and by patterning the transparent conductive layer 90 by photolithography.

Accordingly, the ID mark portion according to the fifth embodiment of the present invention in FIG. 8 is provided.

As mentioned in the above description, when the ID mark pad in the LCD panel is formed using the same material as the source and drain, the ID mark, which is formed at an edge of the substrate of a panel (hereinafter abbreviated glass ID mark), is formed using a substance other than that used for a gate. The glass ID mark formed on the substrate is used for forming an ID mark shape when the ID mark pad is formed with the substance for source and drain.

When the transparent conductive layer 90 is patterned by photolithography, the transparent conductive layer 90 covering the ID mark pad 84 may be formed simultaneously with the pixel electrode 90 to form the sixth embodiment of the present invention shown in FIG. 9. In this case, the transparent conductive layer 90 prevents ID mark pad 84 from being etched by an etchant in later processes.

For the seventh embodiment of the present invention, when the passivation layer is etched, the ID mark pad 84 and a portion of the peripheral or end parts which are not part of the ID mark 85 remain covered by the passivation layer. Thus, the whole ID mark pad 84 in the ID mark portion 86 is not entirely exposed. By the fourth step, the structure of the ID mark portion is not exposed.

Using the methods described with respect ot the sixth and seventh embodiments, the structure of the ID mark portion according to the eighth embodiment of the present invention as shown in FIG. 11 may be formed.

Figure 14:
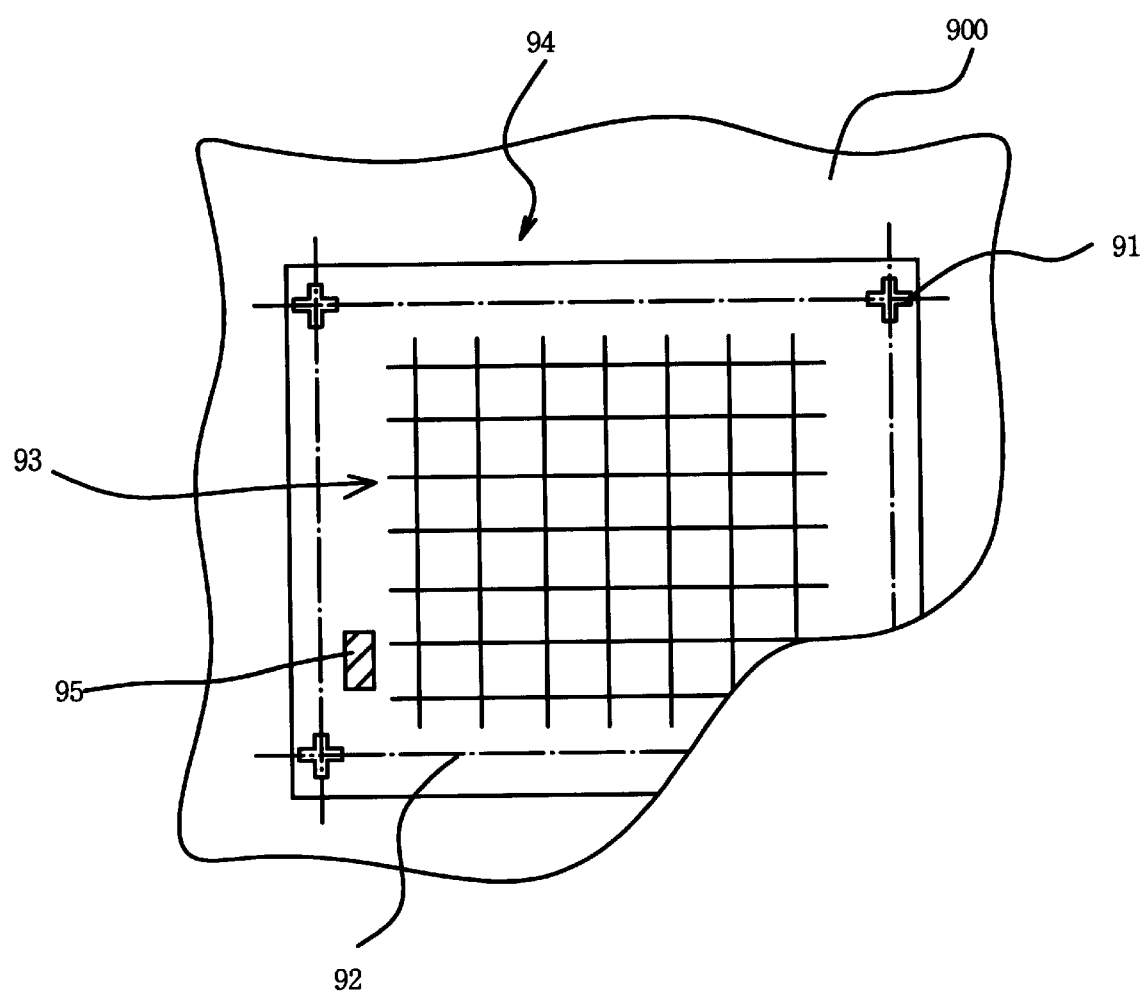
FIG. 14 shows a schematic layout of a substrate showing an ID mark portion and a cutting line.

FIG. 14 shows a schematic layout of a substrate for explaining an ID mark portion and a cutting line.

Referring to FIG. 14, an LCD panel 94 is fabricated on a large substrate 900. An ID mark pad 95 having an ID mark is formed on the LCD panel 94. Thus, an individual LCD panel 94 is distinguishable from other LCD panels.

Figure 1:
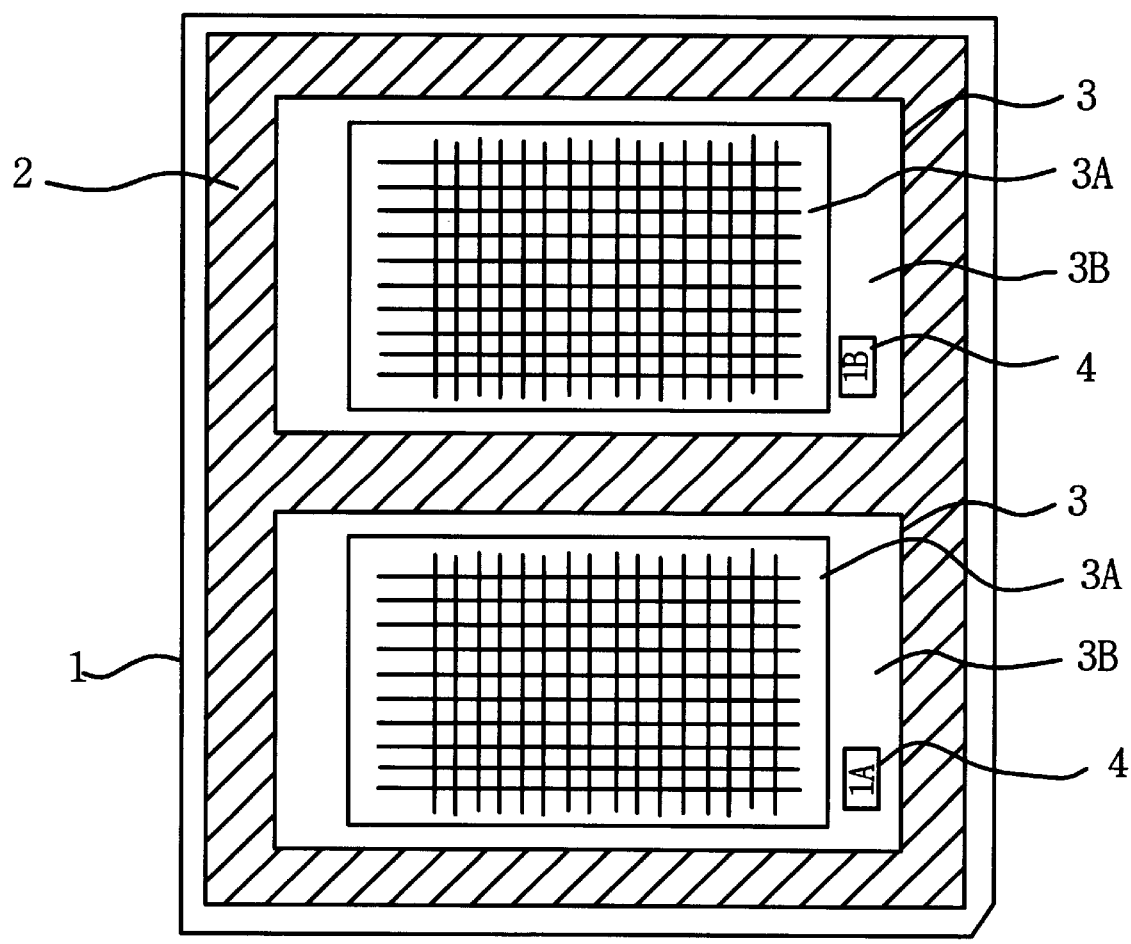
FIG. 1 indicates locations of the ID mark portions in an LCD panel according to the prior art.
Figure 2:
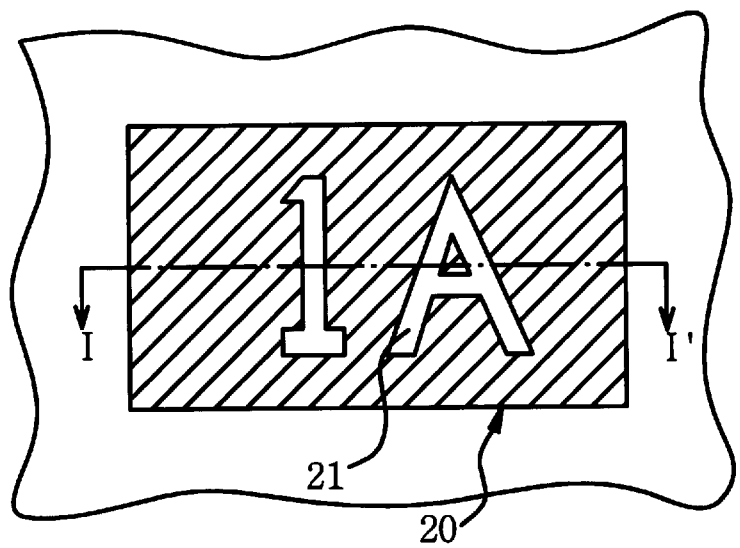
FIG. 2 shows a layout of an identification mark portion of an LCD panel.
Figure 3:
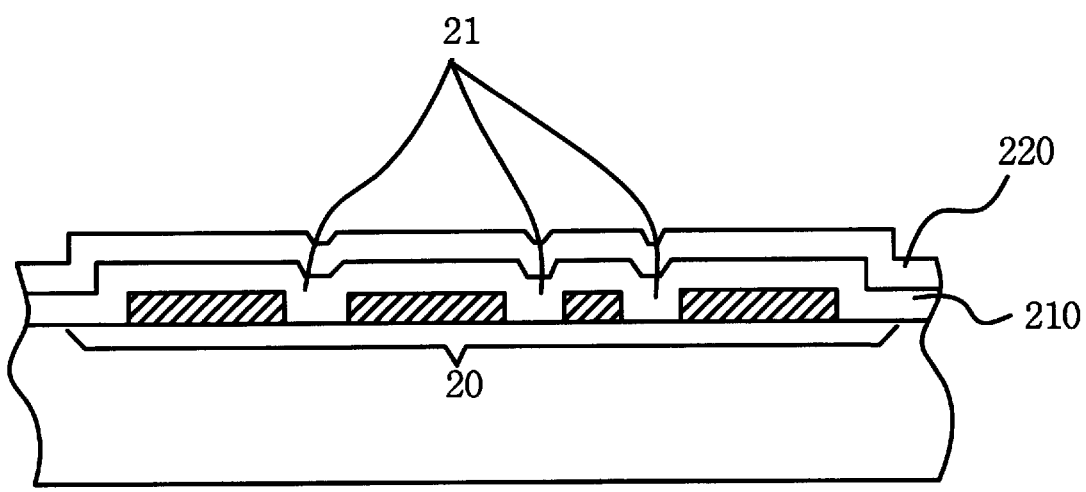
FIG. 3 shows a cross-sectional view of the identification mark portion taken along line I–I' in FIG. 2.

The ID mark pad 95, which is formed in a blank portion or area of the LCD panel 94 is located inside the area defined by the cutting line 92 corresponding to the cutting line intersection 91. The blank area is the area where an image display part 93 and terminals (not shown in the drawing) are not formed (see FIG. 1). Then, a cutting step, which separates the fabricated LCD panel 94 from the large substrate 900, is carried out by a cutting apparatus using the cutting line 92.

Although the above descriptions of the embodiments of the present invention introduce a bottom gate typed TFT such that a gate is formed on a substrate and source and drain wires are formed over the gate, the present invention contemplates using other types of TFTs.

It will be apparent to those skilled in the art that various modifications and variation can be made in an identification mark portion and fabricating method thereof of the present invention without departing from the spirit or scope of the invention. Thus, it is intended that the present invention cover the modifications and variations of this invention provided they come within the scope of the appended claims and their equivalents.

What is claimed is:

1. An identification mark portion in a liquid crystal display panel comprising:
   an insulating substrate;
   a first insulating layer and a second insulating layer on the insulating substrate, the first and second insulating layers exposing the ID mark in the ID mark pad through an opening in both insulating layers;
   wherein the first insulating layer is a gate insulating layer and the second insulating layer is a passivation layer.

2. The identification mark portion in a liquid crystal display of claim 1, wherein the first and second insulating layers expose the whole ID mark pad.

3. The identification mark portion in a liquid crystal display of claim 2, further comprising a transparent conductive layer covering the ID mark pad.

4. The identification mark portion in a liquid crystal display of claim 1, wherein the first and second insulating layers cover an end portion of the ID mark pad.

5. The identification mark portion in a liquid crystal display of claim 4, further comprising a transparent conductive layer covering the ID mark pad.

6. The identification mark portion in a liquid crystal display of claim 1, wherein the ID mark pad is formed with a conductive substance layer for a gate wire in the liquid crystal display.

7. The identification mark portion in a liquid crystal display of claim 1, wherein the ID mark pad is placed within an area defined by a cutting line used for cutting.

8. The identification mark portion in a liquid crystal display of claim 7, wherein the second insulating layer covers an end portion of the ID mark pad.

9. The identification mark portion in a liquid crystal display of claim 8, further comprising a transparent conductive layer covering the ID mark pad.

10. The identification mark portion in a liquid crystal display of claim 7, wherein the ID mark pad is formed with a conductive substance for source and drain wires in the liquid crystal display.

11. The identification mark portion in a liquid crystal display of claim 7, wherein the ID mark pad is placed within an area defined by a cutting line used for cutting.

12. An identification mark portion in a liquid crystal display comprising:
    an insulating substrate;
    a first insulating layer on the insulating substrate;
    an ID mark pad including an ID mark on the first insulating layer; and
    a second insulating layer exposing the ID mark in the ID mark pad through an opening in the second insulating layer;
    wherein the first insulating layer is a gate insulating layer and the second insulating layer is a passivation layer.

13. The identification mark portion in a liquid crystal display of claim 12, wherein the second insulating layer exposes the whole ID mark pad.

14. The identification mark portion in a liquid crystal display of claim 13, further comprising a transparent conductive layer covering the ID mark pad.

15. A method of fabricating an identification mark portion in a liquid crystal display panel comprising the steps of:
    forming an ID mark pad having an ID mark on an insulating substrate; and
    forming first and second insulating layers on the insulating substrate and exposing at least the ID mark in the ID mark pad through an opening in both insulating layers;
    wherein the first insulating layer is a gate insulating layer and the second insulating layer is a passivation layer.

16. The method of fabricating an identification mark portion in a liquid crystal display panel of claim 15, comprising:
    depositing a conductive layer on a substrate;
    coating the conductive layer with a photoresist layer;
    carrying out a first exposure selectively on the photoresist layer except a portion of the photoresist layer corresponding to the ID mark pad;
    carrying out a second exposure on the photoresist layer corresponding to a shape of an ID mark;
    forming a photoresist pattern by developing the photoresist layer;
    etching the conductive layer using the photoresist pattern as a mask;
    forming first and second insulating layers on the substrate and ID mark pad; and
    etching the first and second insulating layers to expose the ID mark pad.

17. The method of fabricating an identification mark portion in a liquid crystal display of claim 16, wherein the first and second insulating layers are etched to expose the whole ID mark pad.

18. The method of fabricating an identification mark portion in a liquid crystal display of claim 17, comprising the step of forming a transparent conductive layer covering the ID mark pad.

19. The method of fabricating an identification mark portion in a liquid crystal display of claim 15, wherein the first and second insulating layers are etched to cover an end portion of the ID mark pad.

20. The method of fabricating an identification mark portion in a liquid crystal display of claim 19, comprising the step of forming a transparent conductive layer covering the ID mark pad.

21. A method of fabricating an identification mark portion in a liquid crystal display panel comprising the steps of:

forming a first insulating layer on an insulating substrate;

forming an ID mark pad on the first insulating layer wherein an ID mark is formed in the ID mark pad; and forming a second insulating layer which exposes the ID mark in the ID mark pad through an opening in the second insulating layer;

wherein the first insulating layer is a gate insulating layer and the second insulating layer is a passivation layer.

22. The method of fabricating an identification mark portion in a liquid crystal display panel of claim 21, comprising:

depositing a conductive layer on the first insulating layer;

coating the first insulating layer with a photoresist layer;

carrying out a first exposure selectively on the photoresist layer except a portion of the photoresist layer corresponding to the ID mark pad;

carrying out a second exposure on the photoresist layer corresponding to a shape of an ID mark;

forming a photoresist pattern by developing the photoresist layer;

etching the conductive layer using the photoresist pattern as a mask;

forming first and second insulating layers on the substrate and ID mark pad; and etching the first and second insulating layers to expose the ID mark pad.

23. The method of fabricating an identification mark portion in a liquid crystal display of claim 21, wherein the second insulating layer is etched to expose the whole ID mark pad.

24. The method of fabricating an identification mark portion in a liquid crystal display of claim 21, wherein the second insulating layer is etched to cover an end portion of of the ID mark pad.

25. The method of fabricating an identification mark portion in a liquid crystal display of claim 24, comprising the step of forming a transparent conductive layer covering the ID mark pad.

* * * * *